United States Patent
Berdut Teruel

(10) Patent No.: US 8,487,504 B2
(45) Date of Patent: Jul. 16, 2013

(54) DYNAMICALLY INDUCED AND REACTIVE MAGNETIC HYSTERESIS APPLICATIONS AND METHODS

(76) Inventor: Elberto Berdut Teruel, San Juan, PR (US)

( * ) Notice: Subject to any disclaimer, the term of this patent is extended or adjusted under 35 U.S.C. 154(b) by 0 days.

(21) Appl. No.: 13/017,067

(22) Filed: Jan. 31, 2011

(65) Prior Publication Data

US 2012/0194019 A1  Aug. 2, 2012

(51) Int. Cl.
- H02K 41/00 (2006.01)
- H02K 49/043 (2006.01)
- H02N 15/02 (2006.01)
- B60L 13/04 (2006.01)
- B61B 13/12 (2006.01)

(52) U.S. Cl.
USPC ........... 310/255; 104/281; 104/286; 104/294; 105/78; 310/90.5; 310/156.01

(58) Field of Classification Search
USPC ...... 310/152–153, 255, 90.5, 156.01; 105/49, 105/53, 54, 77, 78, 281, 283
See application file for complete search history.

(56) References Cited

U.S. PATENT DOCUMENTS

| | | | | |
|---|---|---|---|---|
| 833,635 | A * | 10/1906 | Rogers | 105/77 |
| 1,557,051 | A * | 10/1925 | Hellmund | 105/49 |
| 1,830,747 | A * | 11/1931 | Bray | 238/148 |
| 1,862,248 | A * | 6/1932 | Wesnigk | 105/54 |
| 2,588,710 | A * | 3/1952 | Engelhardt | 105/49 |
| 2,633,302 | A * | 3/1953 | Cooper | 238/164 |
| 3,903,808 | A * | 9/1975 | Foldes | 104/288 |
| 3,909,643 | A * | 9/1975 | Kishima | 310/68 R |
| 4,160,181 | A * | 7/1979 | Lichtenberg | 104/289 |
| 4,315,171 | A * | 2/1982 | Schaeffer | 310/49.53 |
| 5,263,419 | A * | 11/1993 | Moroto et al. | 104/290 |
| 5,317,976 | A * | 6/1994 | Aruga et al. | 104/282 |
| 5,319,336 | A * | 6/1994 | Alcon | 335/296 |
| 5,859,486 | A * | 1/1999 | Nakahara et al. | 310/216.004 |
| 6,510,799 | B2 * | 1/2003 | Lamb et al. | 104/281 |
| 6,982,513 | B2 * | 1/2006 | Fujii et al. | 310/254.1 |
| 7,187,092 | B2 * | 3/2007 | Wauke | 310/49.36 |
| 7,804,220 | B2 * | 9/2010 | Osada et al. | 310/268 |
| 8,232,699 | B2 * | 7/2012 | Letang | 310/90.5 |
| 2008/0223666 | A1 * | 9/2008 | Cuthbert | 187/288 |
| 2010/0314962 | A1 * | 12/2010 | Shiga | 310/156.01 |

FOREIGN PATENT DOCUMENTS

JP  09-205742  * 8/1997

OTHER PUBLICATIONS

Machine Translation of JP 09-205742 to Kawamata, Aug. 1997.*

* cited by examiner

*Primary Examiner* — Burton Mullins
(74) *Attorney, Agent, or Firm* — Luis Figarella

(57) ABSTRACT

A dynamically induced magnetic hysteresis apparatus is described which allows for levitation and adjustable power coupling without direct mechanical attachment or linking. Adjustment of spatial and penetration gaps are adjusted to vary the ratio of rotation.

4 Claims, 8 Drawing Sheets

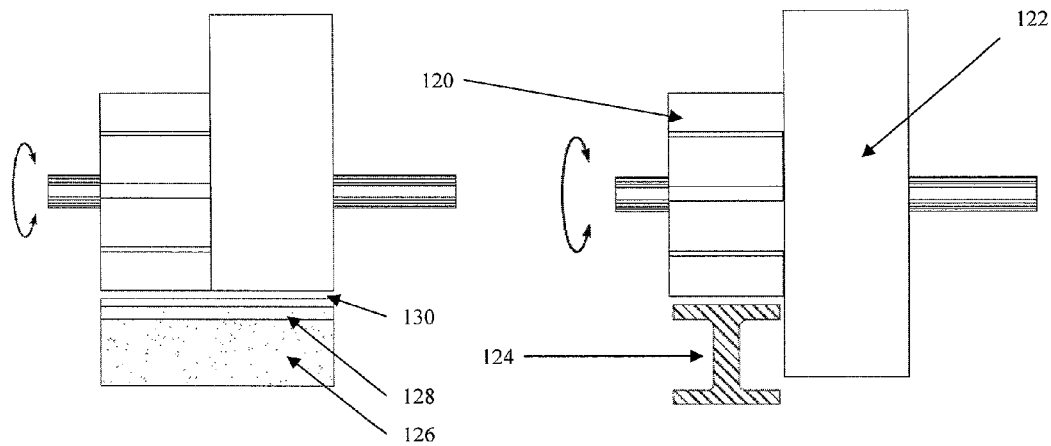
Figure 1C
Figure 1D
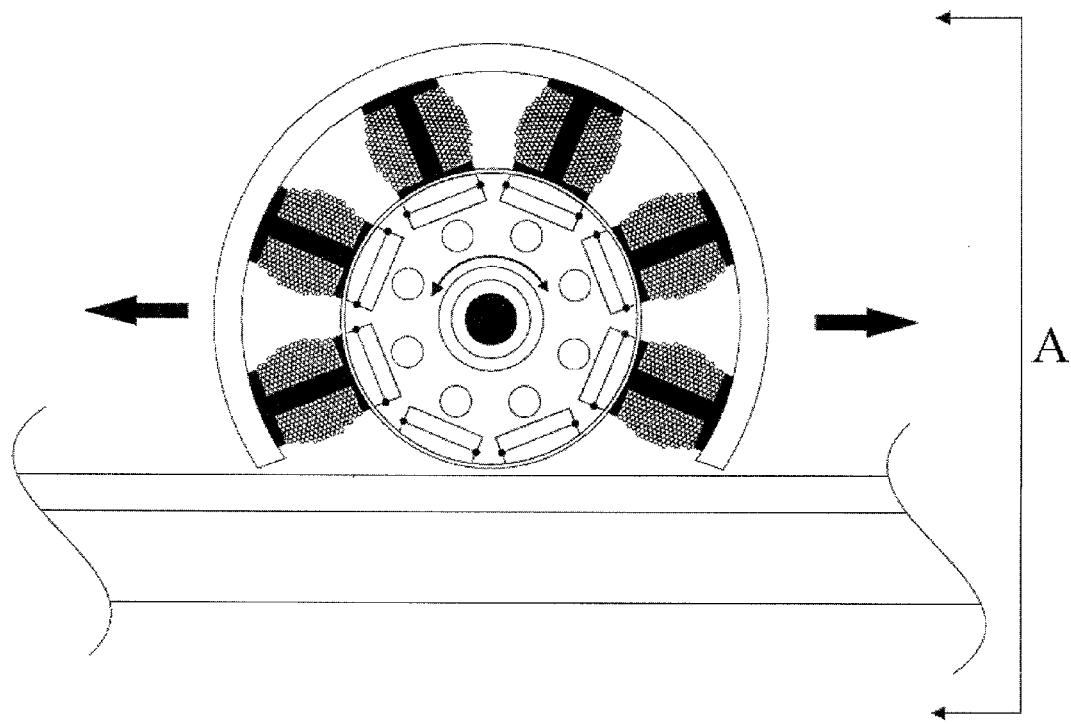
Figure 1B

DYNAMICALLY INDUCED AND REACTIVE MAGNETIC HYSTERESIS APPLICATIONS AND METHODS

PATENTS CITED

The following documents are incorporated by reference in their entirety, Berdut U.S. Pat. No. 5,615,618 "Orbital and modular motors using permanent magnets and interleaved iron or steel magnetically permeable members", and Berdut U.S. application Ser. No. 12/838,955 "Electrical generator having critical Non-Ferrous components".

TECHNICAL FIELD

The present invention generally relates to the phenomena of dynamically induced and reactive magnetic hysteresis (DIMH), and in particular to its applications for levitation and power transfer within coupled mechanical systems in both vertical and horizontal applications

BACKGROUND

The phenomena of power couplings and transfer using permanent and electromagnets are well known. In particular, Toukola (U.S. Pat. No. 5,600,194) teaches a magnetic hysteresis clutch using ferrous or ferromagnetic materials. Johnson (U.S. Pat. No. 7,449,807) teaches a magnetic transmission using permanent magnets matched in a 'magnetic sprocket' drive. Lamb (U.S. Pat. No. 5,909,073) teaches a magnetic coupler having an electromagnetic conductor rotor.

The above have in common the use of ferrous materials in combination with permanent magnets or electromagnets. The use of electromagnets on non-ferrous materials allows for the dynamically induced and reactive magnetic hysteresis transition of the induced magnetic field with no moveable parts. However, when using permanent magnets, the advantages have been limited by the need to have the permanent magnets create the transition via motion.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention In one aspect the invention is an apparatus comprising an asymmetric armature having a plurality of inductive elements, a circular rotor with portions within said armature, said rotor having a plurality of permanent magnets within its periphery and mechanical means connecting said armature to said rotor. In another aspect, the invention is about a rail comprised of ferrous metals, non-ferrous metals, and combinations thereof. In another aspect, the roadway is comprised of a composite formed from all or portions of ferrous, non-ferrous and other phenolic materials.

In another aspect, it is a coupler comprising a first shaft having a first rotary axis, power transmission means attached to said first shaft, said means having a plurality of permanent magnets attached to them, said power receiving means separated from said power transmission means by a spatial gap; and a second shaft having a second rotary axis attached to said receiving means. In another aspect, the coupler's power transmission and power receiving means are comprised of plate structures. In one aspect there are mechanical means for adjusting said spatial gap, while in another said mechanical means dynamically adjust said spatial gap. In one aspect, the coupler's power transmission and power receiving means are comprised of cylindrical structures, with either mechanical means for adjusting said spatial gap, or dynamically adjustable means.

In another aspect, the coupler comprises a first shaft having a first rotary axis, a plurality of drive cylinders attached to said first shaft, each of said cylinders having a plurality of permanent magnets attached to it, a plurality of driven cylinders, each said driven cylinder separated from one or more of its neighboring drive cylinders by a spatial gap and an insertion gap, and a second shaft having a second rotary axis attached to one or more of said driven cylinders. In one aspect the mechanical means for adjusting one or more of said spatial gaps are either pre-set or dynamically adjustable spatial gaps In one aspect, the coupler comprises a first shaft having a first rotary axis, a first rod attached to said first shaft, said rod having a plurality of permanent magnets attached to it, one or more driven plates located in a plane significantly parallel to said first rod axis of rotation, with said rod separated from each driven plate by a spatial gap, and each said driven plate having a shaft attached to said driven plate. In one aspect the mechanical means for adjusting one or more of said spatial gaps are either pre-set or dynamically adjustable spatial gaps. In another aspect, the coupler comprises one or more additional drive rods, each rod connected to its own rotary axis, and each rod having a plurality permanent magnets attached to it.

In one aspect the coupler comprises a first shaft having a first rotary axis, a first transfer plate attached to said first shaft, said plate having a plurality of permanent magnets attached to it, a second plate significantly parallel to said first transfer plate, separated by a spatial gap distance, a second shaft having a second rotary axis attached to said receiving plate, and one or more drive rods, each rod connected to its own rotary shaft along its independent axis of rotation.

Other features and advantages of the present invention will become apparent upon examining the following detailed description of an embodiment thereof, taken in conjunction with the attached drawings.

BRIEF DESCRIPTION OF THE DRAWINGS

FIGS. 1A-1D show illustrations of an open armature dynamically induced and reactive magnetic hysteresis engine according to exemplary embodiments of the invention.

DETAILED DESCRIPTION

Figure 1A:
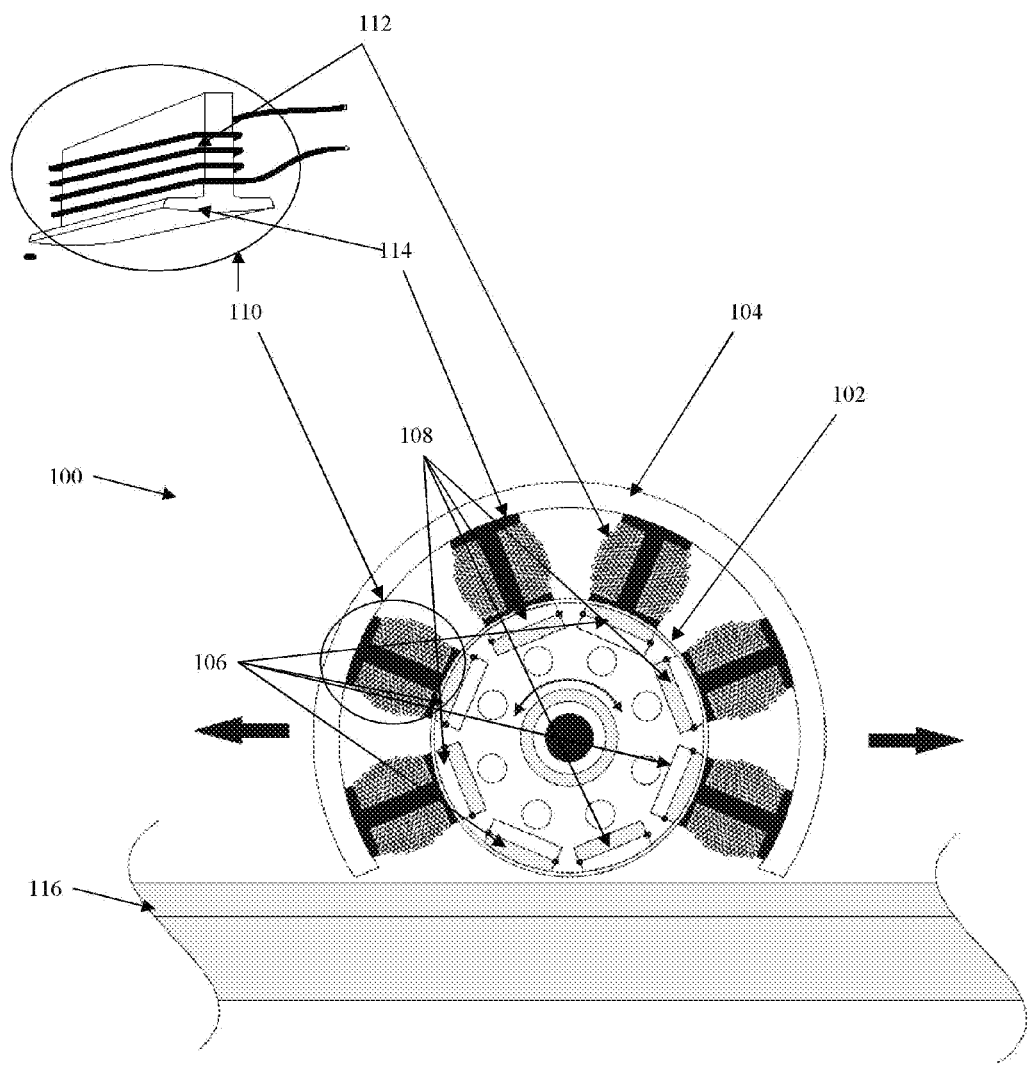

To provide an overall understanding of the invention, certain illustrative embodiments will now be described, including its implementation in a specific apparatus or as a method. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope hereof An embodiment 100 capable of dynamically induced and reactive magnetic hysteresis (DIMH) on a ferrous or non-ferrous metal or composite can be seen in FIG. 1. In it, we see a rotor assembly 102 having permanent magnets designed to fit within an armature or stator 104. In one embodiment, the armature is traditional and symmetric, fully surrounding the rotor. In an alternate embodiment, the armature (as shown in FIG. 1A) has at least one opening, with less inductive elements within it than the number of magnetic (or electromagnetic) elements in the rotor, making it asymmetric in shape. Note that the rotor will rotate as a function of the current flow into the inductive elements, allowing it to rotate in both directions.

The opening in the armature allows for the rotor to be closer to the track 116. In either embodiment, the armature is connected mechanically to a housing that also is connected mechanically to the rotor. One embodiment is a molded housing capable of mechanically affixing the rotor central axle to said housing. Such a molding may be plastic, metal (both ferrous or non-ferrous), wood, etc.

In one embodiment, the permanent magnets within the rotor assembly 102 are comprised of one or more pairs of North polarity (N-pol 106) and South polarity (S-pol 108) permanent magnets placed around a single rotating disk. Pairs of permanent magnets may be used. In that case, the area of the magnets need not be similar, but would be optimal as long as the area of their opposite pole is significantly similar.

Note that in defining North or South polarity on a permanent magnet, we are using the "North" pole of a magnet as defined by the National Bureau of Standards (NBS) convention. Said convention is based on the following: "The North Pole of a magnet is that pole which is attracted to the geographic North Pole. Therefore, the North Pole of a magnet will repel the north seeking pole of a magnetic compass" Its significant opposite is the South Polarity In an alternate embodiment, the rotor's magnets are electromagnets. Like the ones in the armature, they are powered by either a commutation circuit, or directly. In yet another embodiment, the magnets (FIG. 2) within the armature are electromagnetic, and those outside (and above the rail) are permanent magnets.

In one embodiment, the Armature or Stator 104 assembly is unique in that it has an open area. The bobbins or inductive elements 110 are placed in the stator, and as current flows through its windings 112, used to generate a magnetic field. This magnetic field generated by these inductive elements interacts with that of the permanent magnets in the rotor (106, 108), inducing a moment of inertia and the rotation of the rotor 102. Note that in one embodiment, the magnets within the rotor could also be electromagnets, turned on/off via a commutator.

Each individual inductive element 110 is comprised of an assembly of materials. The windings 112 may be comprised of all or parts of ferrous (or ferromagnetic) materials (such as iron coils), as well all or parts of non-ferrous metals (such as copper and aluminum) formed into a single strand of wire. In one embodiment, each wire is individually insulated and wound around a bobbin 114 which may have certain ferrous components, but is principally or completely made of a non-ferrous and/or non-magnetic material.

The possible materials for the bobbins 110 may be comprised of ferrous as well as non-ferrous metals (again, copper, stainless steel, aluminum, lead), phenolic materials, all non-ferrous polymers (including amorphous as well as semi-crystalline plastics), ceramics, wood, fiberglass, carbon fiber composites, epoxy composites and others. Some of the trade names for the above materials include PromoSpire, Torlon, AvaSpire, Amodel and their competitors The rotation of the rotor 102 (again, in either direction, as is the case with all drive rotors in this application) has the consequence of subjecting the roadway, channel or rail 116 to the dynamically induced and reactive magnetic hysteresis phenomena. As with the bobbins 110, the rail or roadway 116 may also be comprised of both ferrous and non-ferrous materials. In addition, composite sandwich structures are particularly desired for aesthetic and/or architectural reasons in the case of a horizontal structure, you could make a railway bed with concrete as an exterior, and metal (again, either ferrous, non-ferrous or itself also a sandwich) interior. In the case of a window-washer support structure, the metal portions could be hidden behind the building's façade.

Through the control of the rate and direction of rotation of the rotor 102, a number of variables may be controlled. When the rotor 102 is not subject to any energy from the bobbins 110, it stops. When the rail 116 has a ferrous metal component, this results in the traditional attraction, effectively securing the assembly 100 to the rail or roadway 116. This would be advantageous as a permanent or "parking" brake in either horizontal or vertical situations. It could also act as an emergency brake (especially if the outside of the rotor 102 had a protective cover made of plastic or even non-ferrous metals).

When the roadway has a ferrous material component, removing the rotation from the rotor 102 will cause the traditional magnetic "stiction" to occur, effectively securing the assembly 100 to the roadway. In horizontal situations, this may act as a parking brake. In vertical situations the rotor would prevent vertical displacement. In an elevator embodiment, removing the rotation of the rotor 102 would act as an optimal "floor" stopper when the elevator is opened at a floor and waiting, or in emergency situations.

When a particular direction of rotation of the rotor 102 is induced and reactive, the reaction is dependent on the roadway material. If a purely non-ferrous metal was used (say copper or aluminum), there will be no reaction until the rotation of the rotor 102 induces the creation of an induced and reactive magnetic field within the non-ferrous metal. If there roadway is made of a ferrous metal exclusively, this induced field will also be created, albeit somewhat faster. Composite structures having a non-ferrous exterior with a ferrous interior (a particularly weather resistant combination) will have a combination of both.

The amount and direction of rotation of the rotor 102 is driven by the order with which the magnetic field is induced into the bobbins 110, something well known to electric motor designers. Through this, both the rate and direction of rotation of the rotor is controllable. In all cases, the rotor 102 magnetic field will interact with the roadway's 116 inducing a reflective moment on the rotor/stator assembly 100. If the assembly is not tied down, it will move In addition to the translational force described above, the induced and reactive magnetic field on the roadway 116 will cause a levitation effect due to the component of the magnetic field that is of equal polarity. This levitation will certainly assist in the displacement of the assembly attached to the assembly 100. Note that the induced and reactive magnetic field also is capable of generating heat, so in one embodiment the assembly may be used to heat a metal piece or extrusion by keeping the assembly 100 stationary or fixed, and moving the roadway or rail under it until a desired temperature is reached.

In one embodiment, the rotor 102 has similar width to that of the armature 104

In alternate embodiments shown in FIG. 1C & FIG. 1D the rotor 120 is wider than the armature 122 (on either or both sides), having the portion of the rotor 120 within the armature providing the rotation moment (through the action of the inductive elements in it), with the magnets in the rotor 120 (both inside and outside the armature in varying degrees) providing the levitation and motion interaction with the rail 116. In one embodiment, this allows for the armature to be symmetric. In an alternate embodiment, the armature is still asymmetric.

The rail or roadway with which the system interacts varies. In one embodiment shown in FIG. 1D, it is a rail 124 made of ferrous, non-ferrous or a combination thereof. In an alternate embodiment shown in FIG. 1C, it is a roadway comprised of a combination of layers. These layers may include concrete, rock or such other suitable substrates 126, a ferrous layer 128 comprised of ferrous materials such as steel, iron and others, and a non-ferrous layer 130 comprised of non-ferrous materials such as aluminum or copper.

Figure 2:
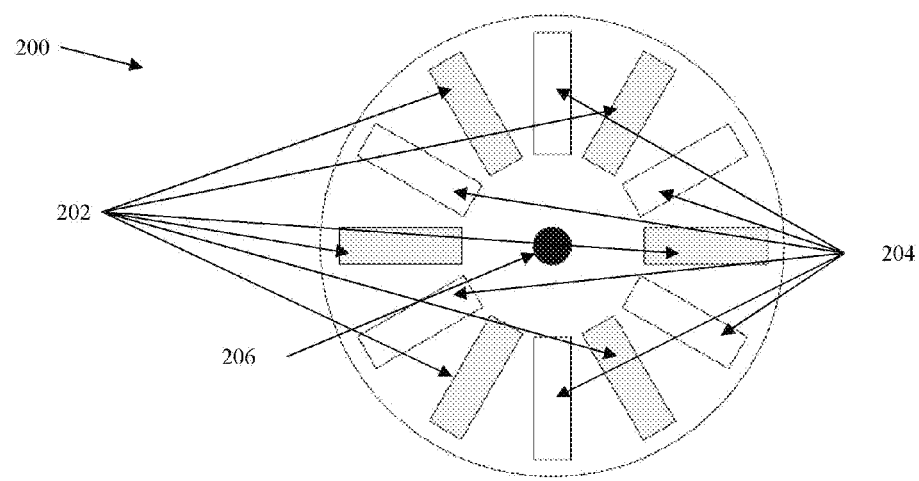
FIGS. 2 and 3 show illustrations of a flat plate dynamically induced and reactive magnetic hysteresis transfer apparatus, according to exemplary embodiments of the invention

The induced magnetic hysteresis phenomena described above is also useful in the mechanically uncoupled or de-linked transmission of power, as is the case in transmissions, torque converters and other power transfer adapters. It is particularly suited to mechanically uncoupled transfers, where the desire is to transfer power, but survive sudden stops, as is the case of automatic transmissions. FIG. 2 illustrates a permanent magnetic field dynamic inducement transfer means, comprised of a plate 200 to be used in inducing such a dynamic magnetic hysteresis according to an exemplary embodiment of the invention.

In one embodiment, the transfer means are comprised of such a plate formed from any number of materials capable of having a rigid form. These materials include metals (both ferrous and non-ferrous), plastics (including thermoplastics and thermosetting polymers), carbon composites, and any number of cement mixtures (including concrete and others), or combinations thereof.

In one embodiment, a plurality of alternating permanent magnets are mounted on the surface of said plate in an alternate embodiment, they are placed within the width of said plate, or below the surface. These magnets may be comprised of a number of rare earth materials, including neodymium, ceramic materials or mixtures thereof. Said magnetic elements may have the shapes of plates, cylinder, hexagonal, octagonal, square and other forms. As described before, the alternating of North 202 and South 204 polarities (or conversely N-S and S-N magnets facing out with a predominant fascia polarity) will result in an induced and reactive magnetic field once the plate begins to rotate around its axis 206.

Figure 3:
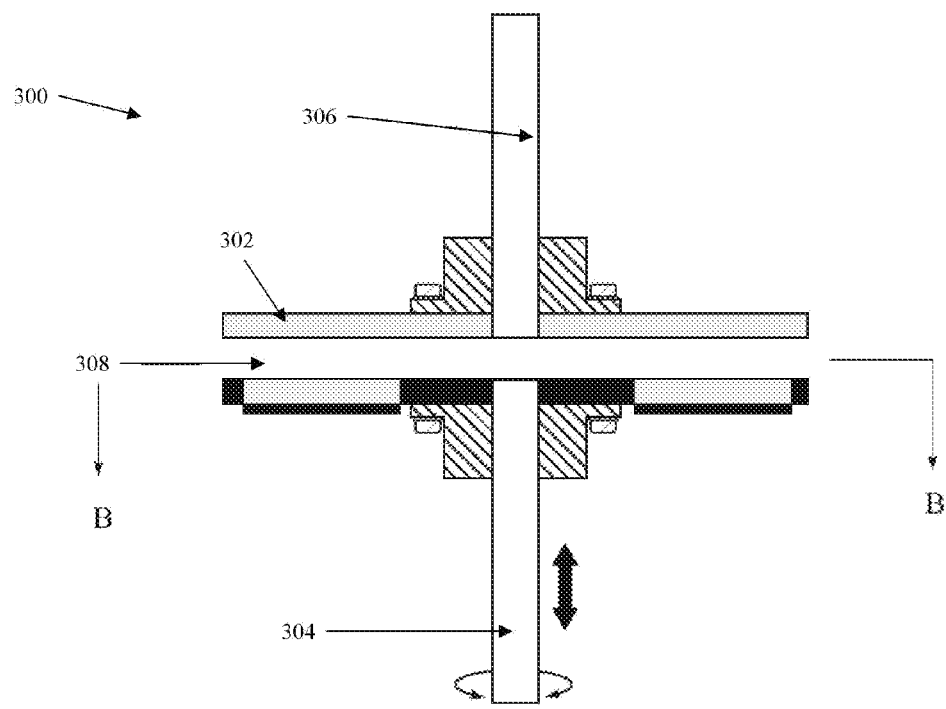

In one embodiment FIG. 3, the transfer of power is accomplished by the close spatial matching of the inducement plate 200 to one or more receiving plates 302. As above, the rotation of the shaft 304 (corresponding to the axis 206), provides an induced and reactive field that will generate a moment of inertia on the receiving plate(s) 302 which proceeds to rotate the driven axle or shaft 306. While both plates (transfer and receiving) may be any size or shape, in one embodiment they are similarly sized and shaped.

In operation, the dynamically induced and reactive magnetic field on the receiving plate 302 operates as the torque converter in a hydraulic transmission, allowing for the complete stoppage of the receiving shaft or axle 306 while the driving shaft or axle 304 continues to rotate. Instead of using a fluid, the operation occurs through the interaction of the magnetic fields, the one from the permanent magnets, the secondary one from the induced and reactive magnetic hysteresis.

There is an amount of slippage (where the revolutions of the driving axle 304 are more than those of the driven axle 306) This slippage is a function of the distance of the gap 308 between the plates 200, 302. In one embodiment, a device is envisioned with a fixed gap. In an alternate embodiment, an adjustable gap 308 is created by the movement of either the driving shaft 304 or the driven shaft 306, or both (whereas the depth adjustment along the axis 206 is defined as the Z direction in a traditional X-Y-Z Cartesian frame).

Notice that the gap distance does not have to be constant. In one embodiment, one or both axles may be equipped with X-Y flexibility, so that over time the rotation of one to the other will try to force the distance of the gap 308 to be relatively uniform. The above is ideal as a potential power transfer clutch or transmission in washing machines, dryers, vehicles and other such machines, particularly in applications such as electric vehicles (air, land and sea) where weight or the ability to reverse directions without undue strain are desired.

While shown in an embodiment surrounded by air, these magnetic couplers may be immersed fluids or gases in order to remove heat (both from mechanical friction and from magnetic friction or slippage). This heat may be detrimental to the mechanical assembly, or it may be beneficial somewhere else in the vehicle. Such is the case in electric vehicles, where heat may be generated while the vehicle coasts as a free side benefit.

Figure 4A:
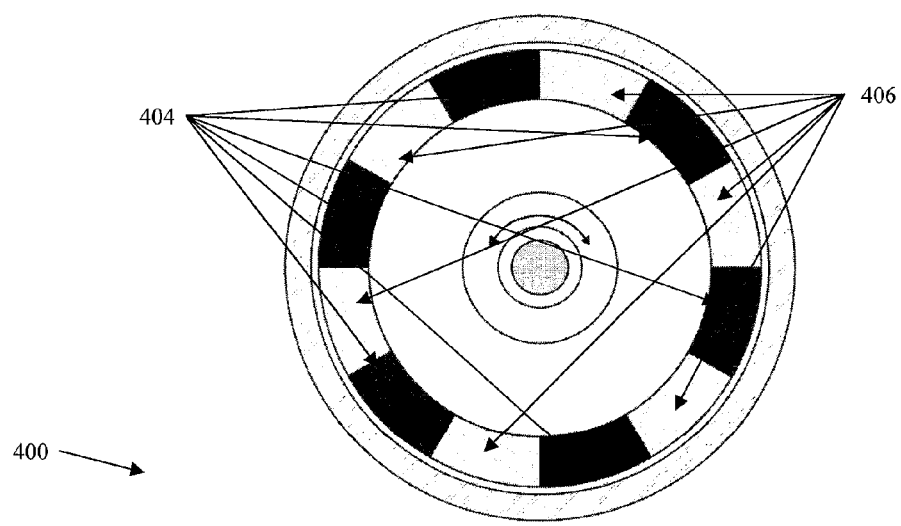
FIGS. 4A-4B shows illustrations of a nested cylinder enhanced dynamically induced and reactive magnetic hysteresis transfer apparatus, according to an exemplary embodiment of the invention.
Figure 4B:
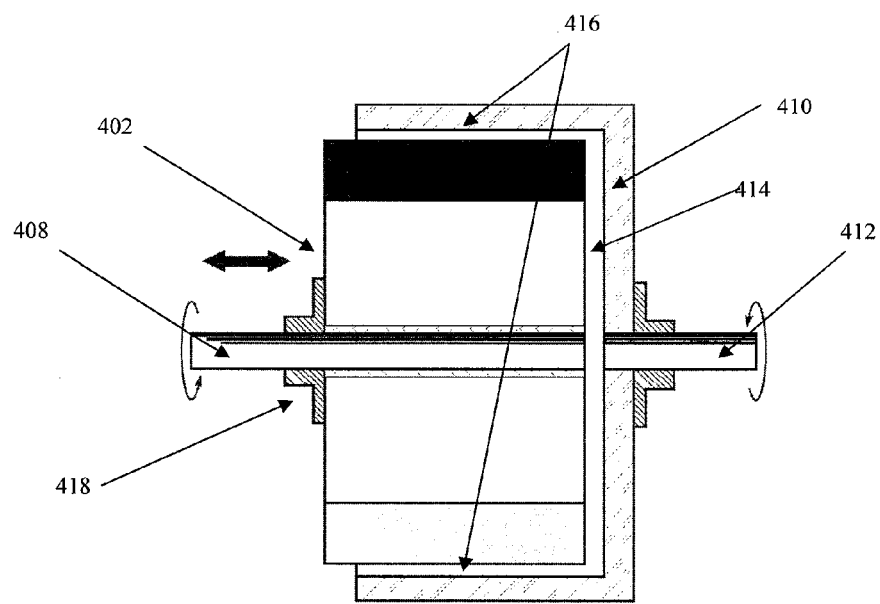

A similar dynamic inductive effect may be observed (FIGS. 4A-4B) when the transfer means are cylinders that are nestled or housed within each other 400. In one embodiment, a drive cylinder 402 is comprised of a series of permanent magnets of alternating polarity (N-pol 404 and S-pol 406). In one embodiment, said magnets are alternatively placed within the surface. In an alternate embodiment, slices of said magnets in combination with some phenolic materials form the actual cylinder structure.

The rotation of the drive axle 408 induces the magnetic field describe before on the driven cylinder 410, resulting in the rotation of the driven cylinder 410 and its axle 412 at a ratio close to 1:1 (with minor losses), whose result is to maintain a certain induced and reactive magnetic field on the driven cylinder 410. As before, the driven cylinder 410 may be made of any metal (ferrous and/or non-ferrous, as well as combinations thereof).

In one embodiment, placing an inner core or sheet of ferrous metal (e.g. iron) surrounded by a non-ferrous metal (e.g. copper or aluminum) within the driven cylinder(s) 410 has shown advantages in startup and operation, through the combination of the ferrous and non-ferrous material properties.

Note the above would be effective when maintaining the depth spatial gap 414 related to the penetration of the drive cylinder 402 within the cavity of the driven cylinder 410. In an alternate embodiment, this gap is made variable, creating a number of ratio positions. In this form, as was the case for gap 308 before, the size of this gap serves as an automatic transmission gear ratio box, by controlling the amount of 'slip', given a certain axle 408 speed and vehicle torque need.

Note that while the depth spatial gap 414 is adjustable, the penetration or insertion gap 416 (formed between the outer walls of the inner cylinder and the outer walls of the outer cylinder) is intended to be constant within mechanical tolerances and the dynamics of rotation. In an alternate embodiment, the cylinders are not of constant diameter, but are instead shaped in a conical form, designed so that the maximum penetration of the outer cylinder maintains both an insertion gap and a spatial gap.

In one embodiment, the shaft 408 connects to the cylinder 410 through a fixed joint. In an alternate embodiment, this joint may be an actuator (be it mechanical, electric, hydraulic, magnetic, pneumatic or spin actuated) that is capable of disengaging at either the drive shaft 410 end, or at the driven shaft 412 end. This would, in the case of a washing machine, allow for the free spinning of either or both cylinders.

In an alternate embodiment, the driven cylinder 410 fits within the drive cylinder 402. In an alternate embodiment, a plurality of drive cylinders, or a drive cylinder with multiple orbits having magnetic members (again either electromagnetic or permanent magnet driven) drives a driven cylinder also having multiple spheres.

Figure 5A:
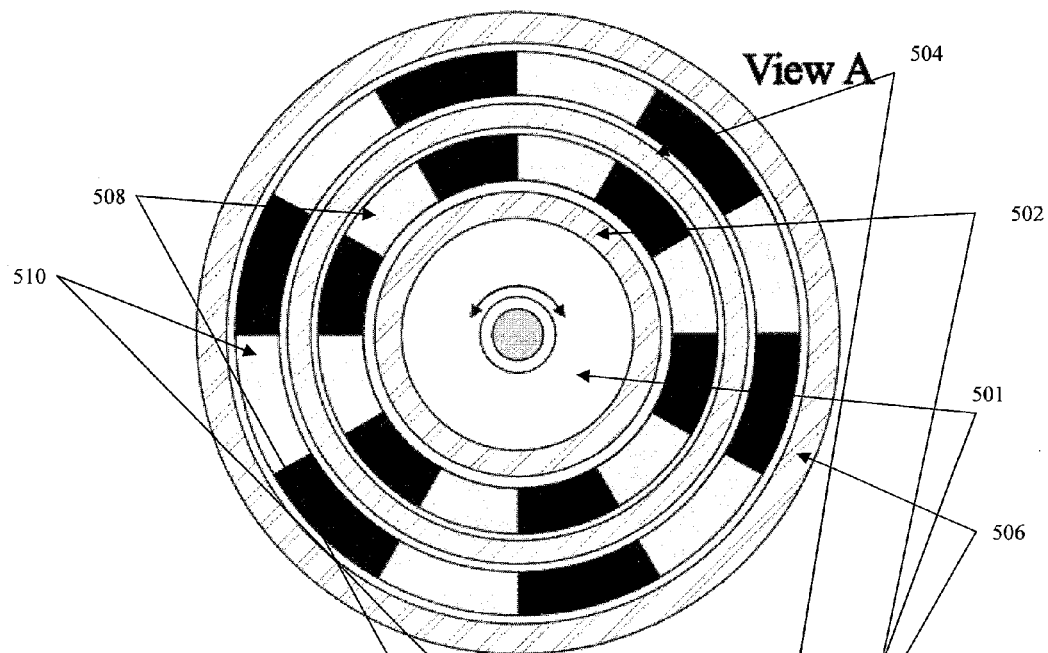
FIGS. 5A-5C show illustrations of a multi-nesting cylinder enhanced dynamically induced and reactive magnetic hysteresis transfer apparatus, according to exemplary embodiments of the invention.
Figure 5B:
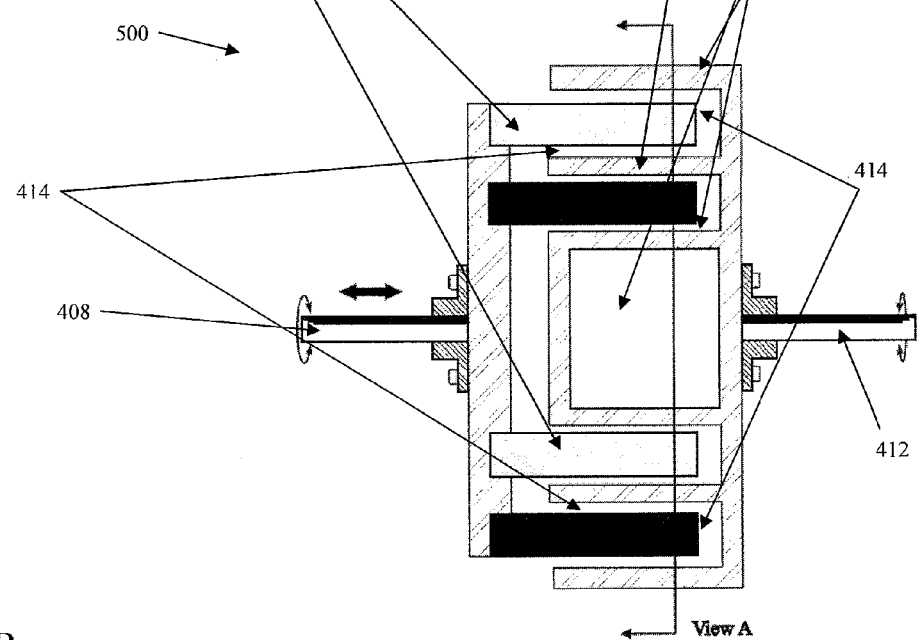
Figure 5C:
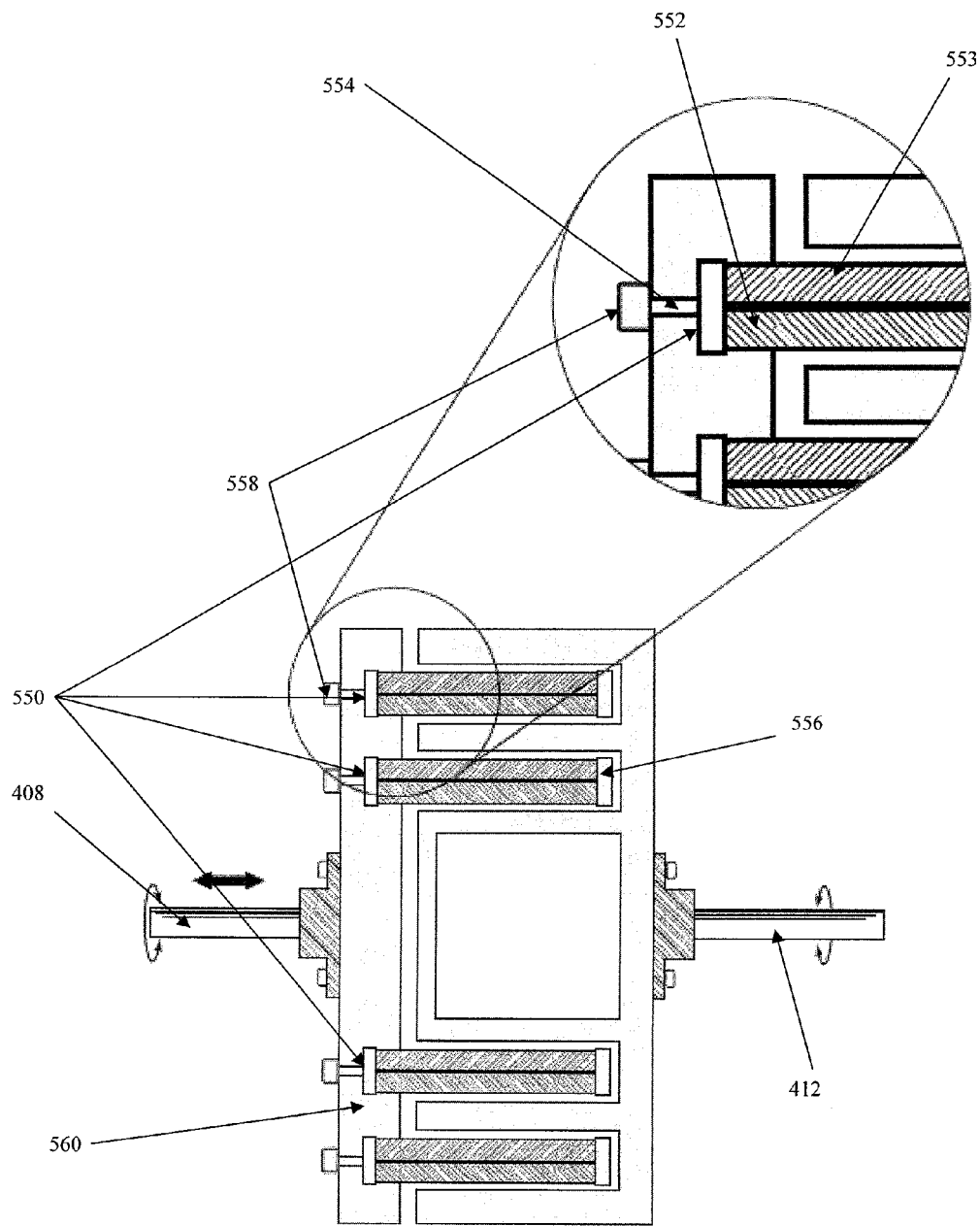

The successive orbits are successively nestled within one another FIGS. 5A-5C. In an exemplary embodiment, we see multiple driven cylinder 502, 504, 506 nestled within two drive cylinders 508, 510.

While they are shown connected at the base, in an alternate embodiment more than two separate cylinders may be used, with their input shafts or output shafts joined or coming/going to separate units. In one embodiment, the complete center hub 501 is made of the same material as the outer walls or orbits. In an alternate embodiment, it may be made of a material different from that of the inner cylinder 502. In this fashion, the center hub 501 may be made of ferrous or non ferrous metals, as well as of phenolic materials, composites (including carbon) or combinations thereof.

As before, the cylinders may sequentially insert in each other to work as an automatic transmission based on sensors. In an alternate embodiment, the user selects the positions based on engine RPMs (similar to a stick shift or semi-automated stick shift transmission).

In one embodiment, the magnetic driving elements 550 are formed from a combination of permanent magnet elements having two sides (552, 553 respectively), secured to a structural element 554. In one embodiment, the structural element is comprised of a long bolt 554 having a cap 556 at one end and a nut 558 at the other. The magnetic elements 552, 553 are assembled as a structural element (forming a ring) having an opening through which the bolts 554 are threaded. The bolt 554 is then secured through an opening in the drive plate. In one embodiment, a ferrous metal assembly is used to form the rest of the cylindrical member surrounding the magnet elements 552, 553. In an alternate embodiment, a phenolic material is used to fill the gaps in the orbit between the permanent magnet elements.

In one embodiment, the magnets both sides 552, 553 are respectively made of a permanent polarity (N-pol or S-pol) and paired, whereas in another they both made are made of the same N-pol or S-pol.

Figure 6:
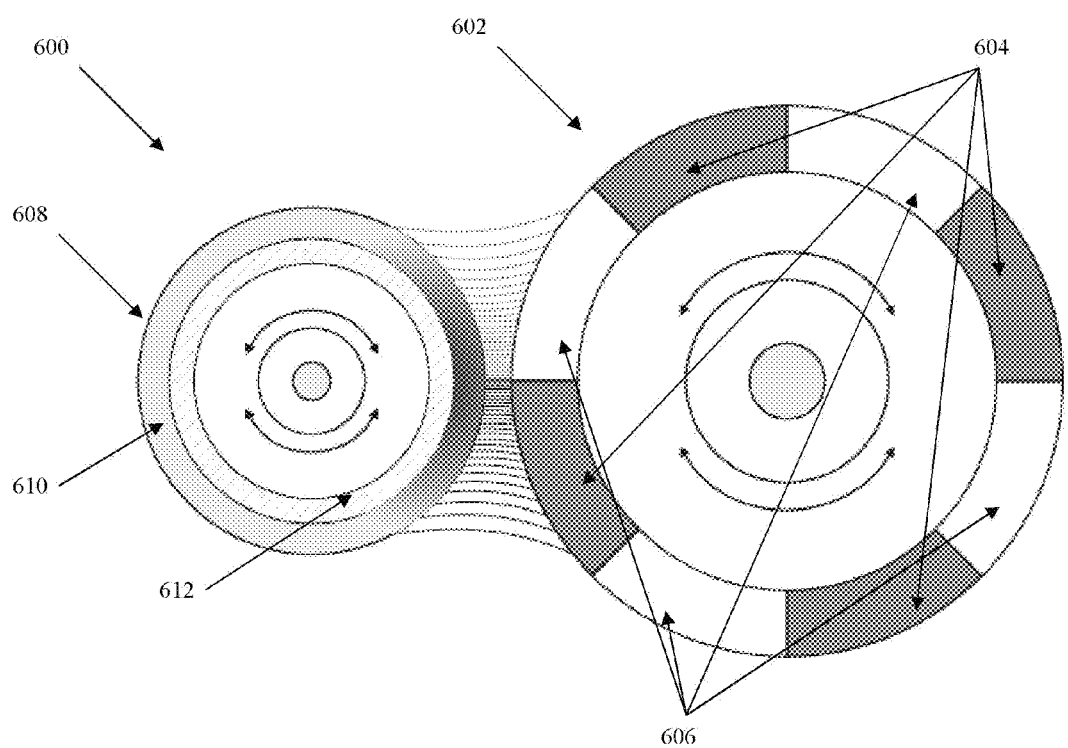
FIG. 6 shows an illustration of a side by side cylindrical enhanced dynamically induced and reactive magnetic hysteresis transfer apparatus, according to an exemplary embodiment of the invention.

As seen in FIG. 6, an additional rotational transfer assembly 600 is accomplished when a drive cylinder 602 comprised of similar alternating polarity magnets (N-pol 604 and S-pol 606) is spun (in either direction) in proximity to one or more driven cylinders 608. As before, these may be ferrous, non-ferrous and/or a composite combination of both as well as of other materials (plastics, carbon composite, concrete, wood, and other phenolic materials).

Figure 7:
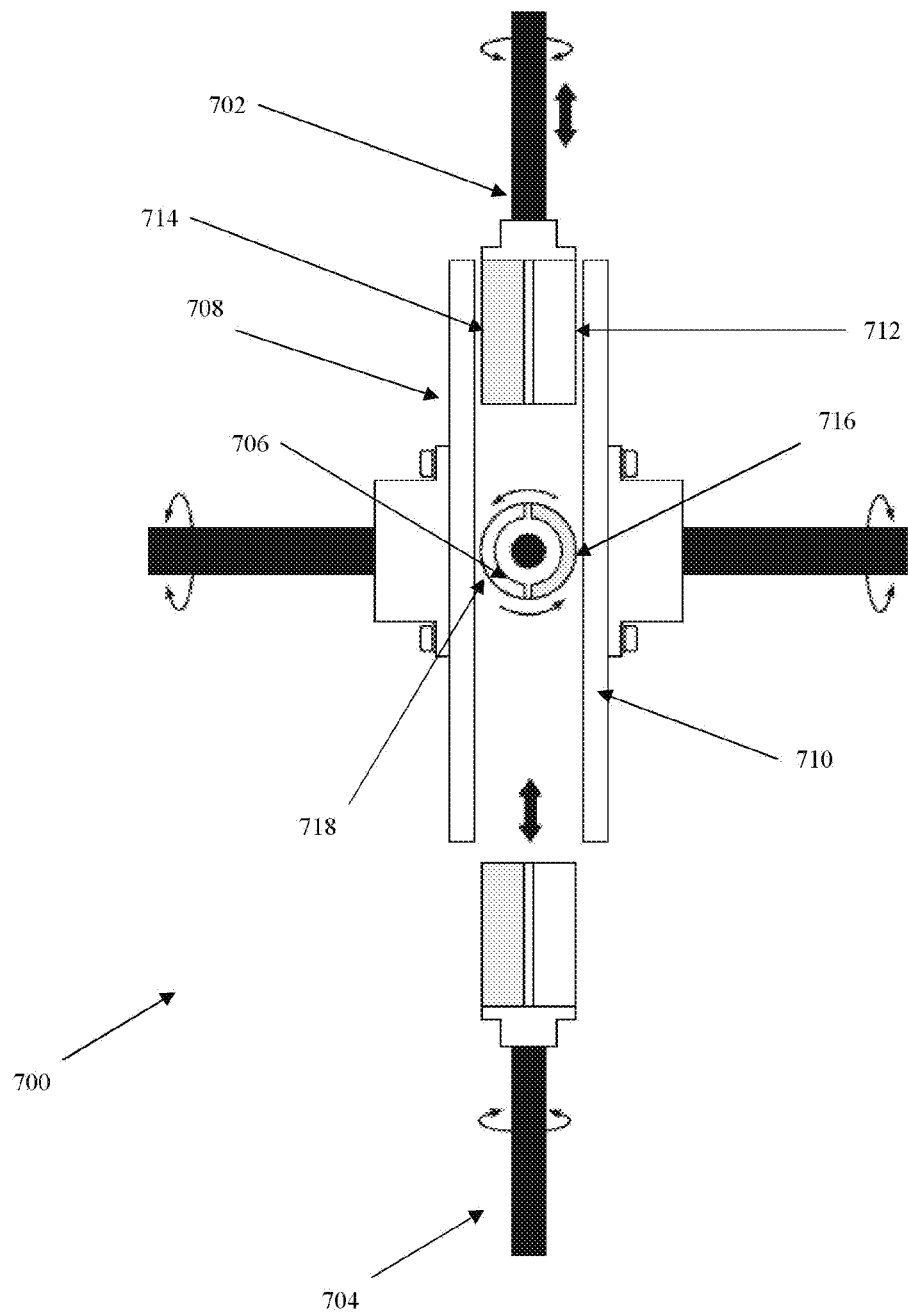
FIG. 7 shows an illustration of a multi-axis enhanced dynamically induced and reactive magnetic hysteresis transfer apparatus, according to an exemplary embodiment of the invention.

In one embodiment, a driven cylinder 608 with an exterior layer 610 of non-ferrous metal (e.g. copper or aluminum) and an interior layer 612 of ferrous metal (steel, iron) has proven to be a good compromise As before, the system in steady state will have a rotation ratio close to 1:1. Any reduction (say through the need for more torque on the driven axle coming off the driven cylinder 608, will result in an increase in the dynamically induced and reactive magnetic field on 608, and either an increase in rotation or heating, In another embodiment, the arrangement may be used to create orthogonal driving axles FIG. 7. In this exemplary embodiment, we see a system 700 where one or more driving cylinders or rods drives 702 (and optional driven rods 704, 706) are used to create a dynamically induced and reactive magnetic hysteresis field on one or more circular driven plates 708, 710. The driving rods (702, 704, 706) are comprised of cylinders with portions of their surfaces having a N-pol, and complementary portions having an S-pol, as described before (such as 402). Each rod is connected to a rod having its rotation axis or axle. The magnets use may be permanent, or electro-magnets.

The rotation of the driving rods (702, 704, 706) creates the alternating magnetic field required to induce the magnetic field on the driven plates 708, 710. The driven plates may be comprised of ferrous metals, non-ferrous metals, or composites comprising said metals and other phenolic materials. As before, the rods (702, 704, 706) are separated from the driven plates by a spatial gap 712, 714, 716, 718. In one embodiment, the gap is similar (e.g. 712=714). In an alternate embodiment, the separation is a fraction or multiplicity of one to the other (e.g. 716=2×718).

In one embodiment, the depth of penetration (or position) of the driving rod(s) (702, 704, 706) is fixed, or at best adjustable during set-up. In an alternate embodiment, the depth of penetration (i.e. position) of each driving rod is adjustable on the fly, in order to operate as an automatic transmission that engages depending on the torque required by the driven plates. A combination of two of the systems 700 connected in cascade would be a superior all wheel drive power transmission media. In one embodiment, the distance between the driven plates 708, 710 is adjustable (either on the fly or at set-up).

In an alternate embodiment, one of the plates 708 is similar in construction to the plate 200 used in FIG. 2, becoming the primary driving plate for the system 700. This drive creates a DINER field which will affect the other metallic disks (710) as well as rods (702, 704, 706). In one embodiment, the rods are built as shown (with portions of N-pol and S-pol permanent magnets along their surface), whereas in another embodiment they are made of the same metal as the driven disk 710.

Various embodiments and features of the present invention have been described in detail with a certain degree of particularity. The utilities thereof can be appreciated by those skilled in the art. It should be emphasized that the above-described embodiments of the present invention merely describe possible examples of the implementations to set forth a clear understanding of the principles of the invention, and that numerous changes, variations, and modifications can be made to the embodiments described herein without departing from the spirit and scope of principles of the invention. Also, such variations and modifications are intended to be included herein within the scope of the present invention, as set forth in the appended claims. The scope of the present invention is defined by the appended claims, rather than the forgoing description of embodiments. Accordingly, what is desired to be secured by Letters Patent is the invention as defined and differentiated in the following claims, and all equivalents.

I claim:

1. An apparatus comprising;
an electric motor that provides magnetic levitation comprising an armature and rotor assembly;
said armature being arc-shaped with one opening along its periphery and a plurality of inductive elements extending radially inward, around the rotor; the rotor having a plurality of pairs of alternating polarity permanent magnets along its periphery and a width greater than that of said arc-shaped armature such that at least one pair of said rotor permanent magnets is outside the magnetic field of the inductive elements of the arc-shaped armature; and
a straight metal rail with a surface tangential to the periphery of the rotor but not in contact with the rotor, said rail located within the magnetic field generated by the rotation of the rotor.

2. the apparatus of claim 1 wherein;
said straight metal rail comprises primarily ferrous metals.

3. the apparatus of claim 1 wherein;
said straight metal rail comprises primarily non-ferrous metals.

4. the apparatus of claim 1 wherein;
said straight metal rail is formed partially or entirely from ferrous, non-ferrous or phenolic materials.

* * * * *